United States Patent [19]

Dupont

[11] 4,350,940
[45] Sep. 21, 1982

[54] SYSTEM FOR SERVOCONTROLLING A SEPARATELY EXCITED DC MOTOR

[75] Inventor: Jean Dupont, La Haye les Roses, France

[73] Assignee: Compagnie Internationale pour l'Informatique CII-Honeywell Bull (Societe Anonyme), Paris, France

[21] Appl. No.: 948,298

[22] Filed: Oct. 3, 1978

[30] Foreign Application Priority Data

Oct. 5, 1977 [FR] France ............................ 77 29996

[51] Int. Cl.³ ............................ G05B 1/02; G05B 1/03
[52] U.S. Cl. ................................ 318/603; 318/615; 318/618; 318/634
[58] Field of Search ............... 318/603, 331, 473, 332, 318/615–620, 632–634, 6; 360/73; 226/188; 242/75.51

[56] References Cited

U.S. PATENT DOCUMENTS

| | | | |
|---|---|---|---|
| 3,185,364 | 5/1965 | Kleist | 226/188 |
| 3,559,018 | 1/1971 | Fournier | 318/618 |
| 3,614,569 | 10/1971 | Reinert | 318/332 |
| 3,648,191 | 3/1972 | Scheer | 318/314 |
| 3,706,020 | 12/1972 | Klang | 318/400 |
| 3,731,176 | 5/1973 | Mitchell et al. | 318/619 |
| 3,828,168 | 8/1974 | O'Callaghan | 318/603 |
| 3,860,861 | 1/1975 | Gucker | 318/473 |
| 3,953,774 | 4/1976 | Sato et al. | 318/594 |

Primary Examiner—David Smith, Jr.
Attorney, Agent, or Firm—Lowe, King, Price & Becker

[57] ABSTRACT

A separately excited D.C. motor employs an analog servo control responsive to a speed control input signal that controls the derivation of a compensating signal for the motor back emf. The speed control and compensating signals are combined to control the motor speed via an analog regulator. A digital shaft encoder responsive to the motor position supplies a pulsed signal to a comparator that is also responsive to a desired position signal that is derived from the speed control signal. The comparator derives an integrated error signal that is supplied to the analog regulator. Application of the speed control signal to the regulator is delayed if a thermal simulator for the motor characteristics indicates motor overheating. In response to the compensated, desired speed indicating signal indicating that the motor has been ordered to stop, the error signal is decoupled from the analog regulator. The integrated error signal is reduced to zero if the compensated desired speed indicating signal indicates either a theoretical halt of the motor capstan, or a high speed instruction. The error signal remains briefly at zero if the compensated desired speed indicating signal orders a start cycle.

25 Claims, 10 Drawing Figures

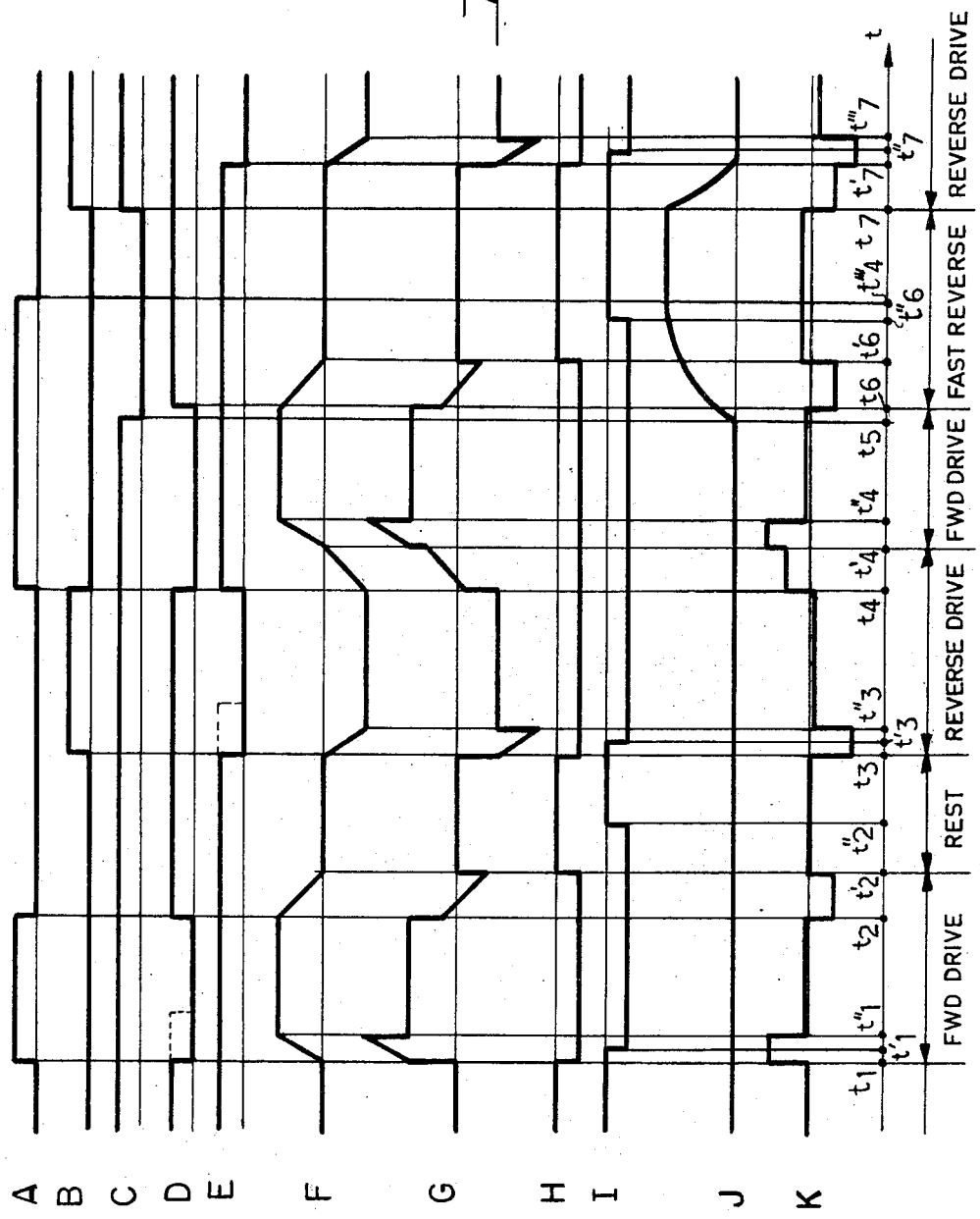

SYSTEM FOR SERVOCONTROLLING A SEPARATELY EXCITED DC MOTOR

FIELD OF THE INVENTION

The present invention relates to a method and a system for servocontrolling a separately excited DC motor, and more particularly to a system wherein an analog error is corrected by a digital position feedback.

BACKGROUND OF THE INVENTION

It is well known that the speed of a separately excited DC motor is proportional to its supply voltage. In addition, speed is independent of load if the motor internal voltage drop due to the motor armature current is zero, or if the supply voltage to the motor is increased by an amount equal to the internal voltage drop.

The natural stabilization of the speed of rotation of such a motor to the supply voltage results in speed variations of a few percent, as the following example demonstrates. Assume that a separately excited DC motor which requires a current of 0.6 amperes to turn it has a back-electromotive force E of 12 volts, a hot resistance R of 1 ohm. Also assume that this motor is fitted with a capstan to unwind a tape, such as a magnetic tape, and that forces causing irregularities in the tape movement are ±50% of the nominal friction (these irregularities being reflected by a variation in current ΔI of 0.3 A), the variations ΔE in the back-emf which result in motor speed changes are thus equal to:

$$E = \frac{R(\Delta I)}{E} = \frac{1 \times 0.3}{12} = 2.50\%$$

the stabilities of the back-emf and speed are therefore remarkable.

If high motor acceleration is required, the motor current is considerable and in practice depends only on the motor electrical characteristics and the inertia involved, with friction playing only a very small part. As a result, the servocontrol chain for this motor is of the analog type. The chain reacts to a speed indicating signal derived as the motor back-emf, as derived from the motor winding. The chain is made up, in essence, of a power amplifier supplying the motor armature, an analog regulator, and a generator for a control signal that indicates the speed required by an operator. The required speed signal is applied to the analog regulator to energize the power amplifier and operate the motor accordingly.

Such a servocontrol chain is advantageous because with the speed "sensor" being the motor winding, there is no delay in receiving signals for the motor speed. The chain is very simple, well known to those skilled in the art, highly reliable, and naturally stable. It does not require phase-correcting circuits and, as demonstrated above, constant speed is obtained.

Despite all these satisfactory qualities, the degree of stabilization achieved still falls short of that which may be desired in certain cases, because there is only partial compensation for the internal drop in the armature and due to differences in the back emf constant of different motors and as a function of temperature. A solution to the deficiency in performance caused by the partial compensation for the internal drop is found in my co-pending commonly assigned U.S. patent application Ser. No. 914,987 entitled "A system for Controlling a Separately Excited, Constant Load DC Electric Motor" filed June 12, 1978; this solution is used in the described embodiment of a servocontrol system according to the present invention. Other causes of deficiency mentioned above are random variables: (1) inherent in the manufacture of the motors and ancillary components of the motors, and (2) in the conditions in which the motors are used (ambient temperature for example). Hence, it is necessary to have recourse to another method of servocontrol to provide for variables of this nature.

The search for a servocontrol capable of bringing the motor accurately to a required position so that a driven member, such as a magnetic tape, assumes a required position, has usually involved servocontrolling the speed of the motor with analog or digital techniques.

Analog techniques seem to be necessary for improving the simple analog servocontrol chain described above if all the advantages of the chain are to be effectively preserved. However, because of the nature of the causes of deficiency described above, the system becomes very complicated and the required adjustments militate against mass production and easy trouble shooting, causing relatively high costs.

Digital techniques have the advantages of providing the expected results and of avoiding adjustments. Nevertheless, if digital techniques are used, rather than the simple analog servocontrol system, very valuable advantage is sacrificed. In view of the very severe demands on the new servocontrol, the digital techniques require a large number of components to be used and complicate the circuitry.

At the present time, neither the analog nor digital methods of servocontrol provides the exact stabilization necessary to enable the motor driven member to be controlled to the precision required by an operator. However, in many systems, e.g. for driving magnetic tapes, increasingly exacting demands prevent the desired standards of performance from being achieved by currently envisaged servocontrol systems.

BRIEF DESCRIPTION OF THE INVENTION

The present invention provides a servocontrol system which enables the desired results to be achieved without changing the prior art simple analog servocontrol chain.

A method according to the invention for servocontrolling a separately excited DC motor which employs an analog servocontrol related to the motor back-electromotive force is characterized by a digital correction for errors of the analog servocontrol relative to a reference value representing the desired position of the motor. This method is thus distinguished from previous methods by two main features which exist in a judicious combination: viz., the invention corrects for errors in the actual position of the motor relative to the desired position, and this correction is made digitally.

Because of the often indeterminate, even random, nature of the above mentioned causes which upset the control of a separately excited DC motor, the invention is based on the realization that the speed stabilization generally employed in the prior art is inadequate or must, as was seen above, rely on complicated and expensive improvements. To overcome these disadvantages, the invention retains analog servocontrol and corrects it by means of a system for correcting errors in the motor position (which is equivalent to the actual position of the member which it is driving) in relation to its desired position. By virtue of the position stabilizing according to the invention, in a given period the length of tape unwound by the motor is exactly that planned, whether the unwinding be at normal speed or when the tape is being started or stopped. In other words, the position servocontrol gives closely defined stop positions corresponding to those required. In addition, it provides a speed which is independent of friction, of the stresses exerted by the driven member, and of the motor characteristics, since the servocontrol only uses positions as a reference and controls speed as a function of these positions. This latter feature means that there cannot therefore be any error in the mean motor speed.

The advantages of digital processing for performing the correction are clearly apparent from the following description.

Thus, a servocontrol system according to the invention is used for a separately excited DC motor provided with an analog servocontrol chain. The analog chain comprises a control signal generator for the required motor speed, and an analog regulator responsive to the required speed signal to supply a motor control signal to a power amplifier that adjusts the motor speed. The invention is characterized by a digitial chain for correcting errors in the position of the motor relative to a desired position. The digital chain comprises a motor shaft encoder that derives a first pulsed signal representing the actual motor position, and a means for comparing the signal representing actual motor movement with a signal for the desired movement which is formed from the said required speed signal, in order to supply an error signal to the said analog regulator.

The above and still further objects, features and advantages of the present invention will become apparent upon consideration of the following detailed description of several specific embodiments thereof, especially when taken in conjunction with the accompanying drawing.

DETAILED DESCRIPTION OF PREFERRED EMBODIMENT

Figure 1:
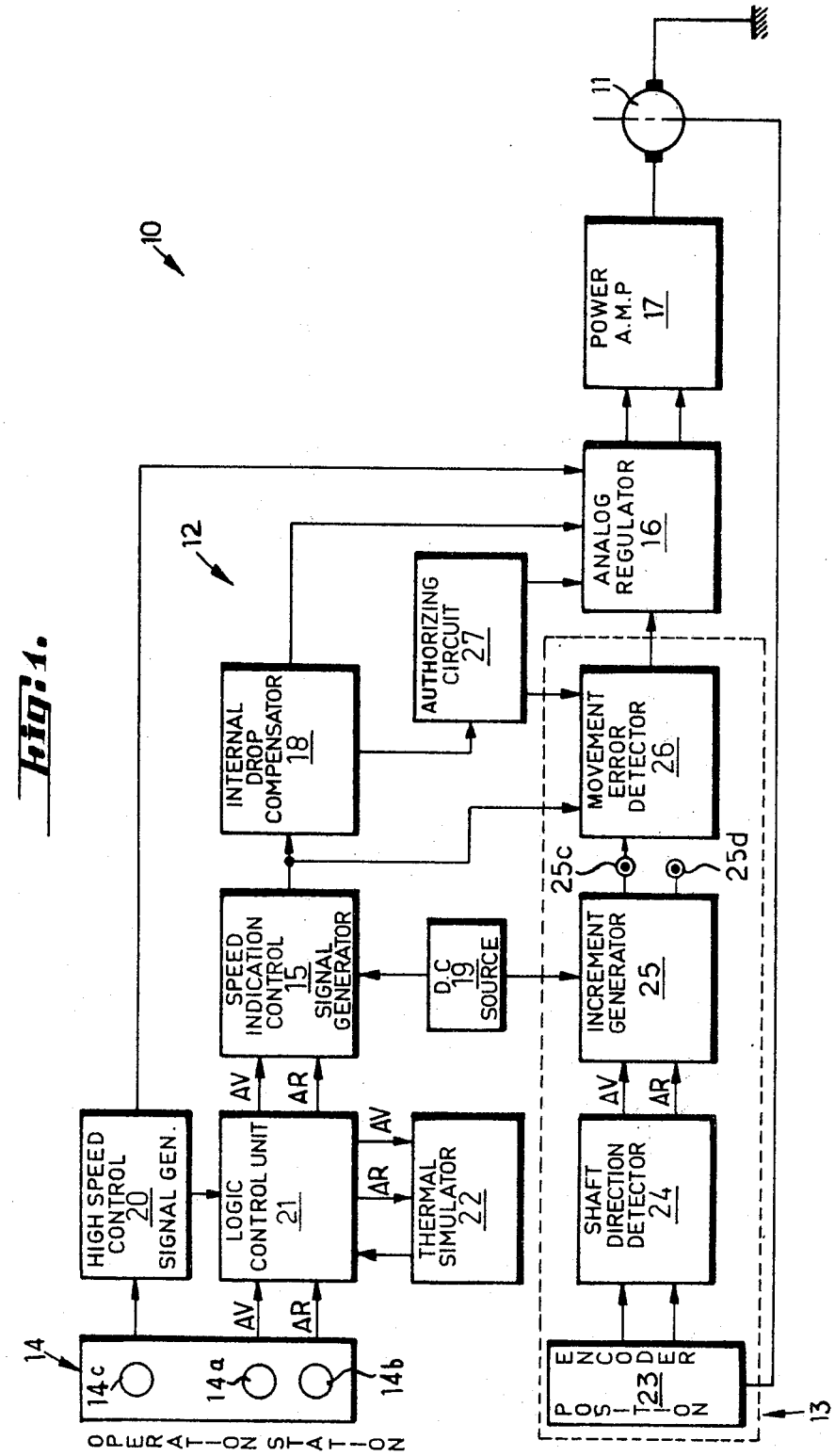
FIG. 1 is a block diagram of a preferred embodiment of servocontrol system according to the invention, FIGS. 2A, 2B, 2C and 2D, in association, are a circuit diagram of an actual embodiment of the servocontrol system illustrated in FIG. 1.

FIG. 1 illustrates, in block diagram form, a servocontrol system 10 according to the invention which controls the running of a separately excited DC motor 11. So that the features and advantages of the invention may be properly described, it is assumed that the servocontrol 10 is used in an apparatus for unwinding a tape, such as a magnetic tape. Motor 11 is fitted, for this purpose, with a capstan, not shown.

Motor 11 has an armature with opposite terminals respectively connected to earth, i.e. ground, and to an analog servocontrol chain 12 associated with a digital correcting chain 13.

In conventional fashion, servocontrol chain 12 includes: an operator input or instructing member 14, such as a keyboard having push buttons 14a, 14b and 14c, which respectively control the derivation of forward (AV), reverse (AR), and fast rewind signals. Generator 15 responds to signals AV and AR to derive a control signal for a desired, predetermined speed of motor 11. The control signal derived by the generator determines the motor speed corresponding to the speed indicated by buttons 14a and 14b, as well as the starting and stopping periods for the motor. An analog regulator 16 responds to the control signal from generator 15 and a signal derived in response to activation of fast forward button 14c to adapt the required speed signal to the back emf of motor 11 and thereby provide a control signal for the motor. Power amplifier 17 responds to the motor control signal derived from regulator 16 to regulate the speed of motor 11 accordingly.

Servo chain 12 preferably contains a plurality of optional ancillary members which, in certain cases, are able considerably to improve the operation of system 10. The speed indicating control signal derived by generator 15 is applied to analog regulator 16 via device 18 that compensates for the internal motor drop, as disclosed in the above mentioned patent application Ser. No. 914,987. Device 18 enables the armature of motor 11 to be directly grounded to make the drop compensation. DC reference voltage source 19, associated with generator 15, assists in forming the speed control signal. High speed control signal generator 20 couples the fast rewind output signal of instruction member 14 to regulator 16 in parallel with the normal speed path containing the generator 15.

Output signals AV and AR of instruction member 14 are coupled to normal speed control generator 15 by a further optional device, logic control unit 21. Unit 21 responds to control generator 20 to prevent motor 11 from running at normal speed in favor of fast running when the operator orders motor 11 to run fast. Hence, operation of generator 15 is inhibited in favor of generator 20 to prevent any ambiguous control signals from being supplied to motor 11 if the operator should activate buttons 14a, 14b or 14c to cause simultaneous instructions to be derived from member 14. Associated with the logic control unit 21 is a thermal simulator 22 for motor 11. Simulator 22 reacts to the normal speed forward or reverse running instruction derived by logic control unit 21 to simulate the motor heating. If the simulated heating exceeds a predetermined threshold value, simulator 22 causes logic unit 21 to delay the operator instruction by a period considered adequate for the motor to be able to operate again under normal temperature conditions. Simulator 22, illustrated in FIG. 2C of the present application, is the subject of co-pending U.S. patent application Ser. No. 932,634 entitled "Apparatus and Method for the Thermal Simulation of a Constant Load Electric Motor" filed Aug. 10, 1978.

Digital chain 13 corrects for errors in the position of motor 11 with respect to a desired position determined on the basis of the reference speed set by the generator 15. In essence, chain 13 encodes the actual position of motor 11, and compares the encoded actual motor position with desired motor position, as determined by the required speed signal. Digital chain 13 supplies analog regulator 16 with an error signal which corrects servo chain 12.

Figure 6:
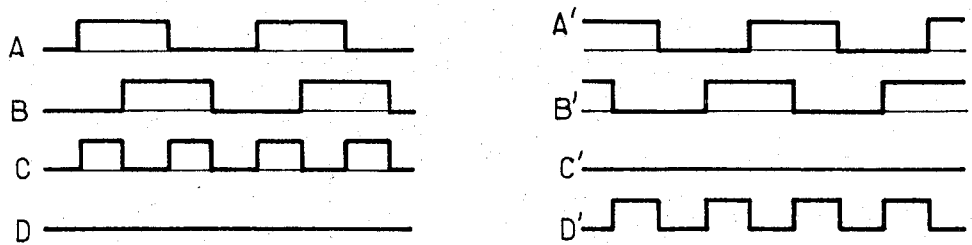

In the embodiment of FIG. 1, encoder 23, coupled to the shaft of the motor 11, emits two out of phase pulsed (square-wave) signals, as illustrated in FIG. 6 by waveforms A, B when the shaft is turning in the forward direction and by waveforms A', B' when the shaft is turning in the reverse direction. The out of phase signals are supplied to detector 24 which detects the direction of rotation of the motor 11 and forms a frequency doubler to derive waveforms C and D (FIG. 6) when the motor shaft is turning in the forward direction and waveforms C' and D' when the shaft is turning in the reverse direction. Hence, in response to forward rotation of the motor shaft, detector 24 supplies a square wave having a frequency proportional to the displacement of the shaft to lead AV while supplying a constant, zero level to lead AR. In response to reverse rotation of the motor shaft, detector 24 supplies a zero level to lead AV while supplying a signal having a frequency proportional to the displacement of the shaft to lead AR. The two outputs of the direction detector 24 correspond respectively to the forward direction of running AV and the reverse direction of running AR of the motor. Increment generator 25 responds to outputs AV and AR of direction detector 24 to derive on lead 25c bi-polar, constant amplitude pulses having edges corresponding with at least one of the two edges of each pulse derived on output leads AV and AR of the direction detector 24. Preferably, the leading and trailing edges of the pulses on lead 25c are synchronized with the leading and trailing edges of the waveforms C or C' illustrated in FIG. 6. The pulses on lead 26c have constant voltage determined by the DC reference source 19 for example and of a polarity representing the rotation direction of the motor shaft. Error detector 26 compares the desired movement of motor 11 (its movement being the product of time multiplied by the speed of the motor when running forward or backward), as represented by the output signal of generator 15, with the movement or displacement detected by the encoder 23 and processed by the direction detector 24 and the increment generator 25. Error detector 26 subtracts the desired movement indicating signal derived by generator 15 from the actual, detected movement indicating signal derived by detector 24 and integrates the resultant to supply analog regulator 16 with an error signal intended to correct any positional error for the shaft of motor 11.

Figure 4:
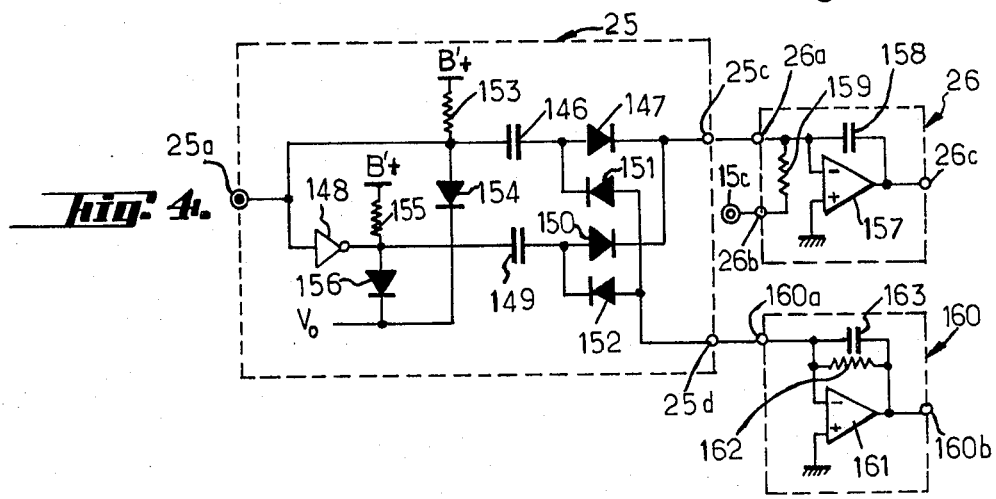
FIG. 4 is a circuit diagram of the increment generator, error detector and tachometer shown in FIG. 1, FIG. 5 are examplary waveforms extracted at various points in the control system shown in FIGS. 2A to 2D, FIG. 6 are waveforms to illustrate the operation of the direction detector shown in FIG. 2A, and, FIG. 7 includes two waveforms relating to the high speed control generator shown in FIG. 2B.

In addition, one output terminal 25b of the increment generator 25 can be connected to a tachometer (not shown in FIG. 1) having a circuit diagram illustrated in FIG. 4. The tachometer derives a DC voltage having a level proportional to the rotation rate of the motor shaft; the voltage can be supplied to an appropriate indicator for information purposes.

Finally, system 10 includes an authorizing circuit 27 which receives from internal drop compensating device 18, a desired speed indicating signal. If the desired speed signal derived from device 18 indicates that motor 11 has been ordered to stop, the output error signal of detector 26 is decoupled from regulator 16 so that a non-zero error signal does not have an adverse effect on the stop command. The integrated output error signal of detector 26 is rapidly reduced to, or remains at, zero if authorizing circuit 27 determines in response to the speed indicating output signal of device 18 any of: (1) generator 15 signalling a theoretical halt for the capstan of motor 11, (2) a high speed instruction by member 14, or (3) an order by member 14 instructing a start cycle. The output of detector 26 is only briefly maintained at a zerol level for situation (3) to provide a short delay in the starting of motor 11 if the operator erroneously entered a command into member 14.

Figure 2A:
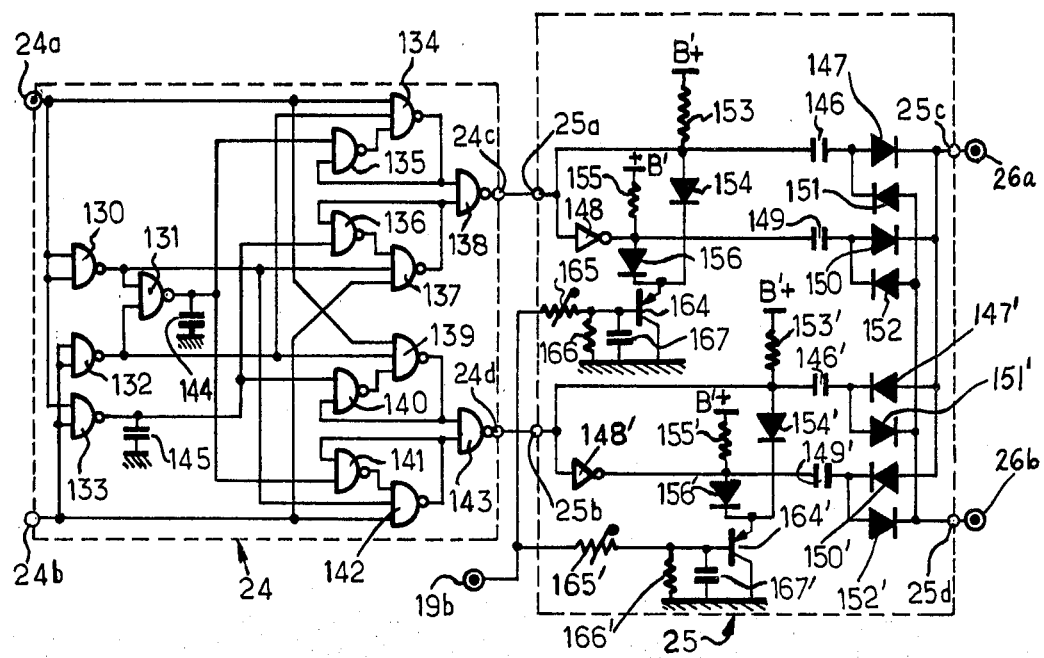

Reference is now made to FIGS. 2A to 2D wherein the preferred circuits in all of the blocks indicated in FIG. 1 are illustrated. The waveforms shown in FIGS. 5, 6 and 7 and the two general diagrams shown in FIGS. 3 and 4, provide a better understanding of the operation of system 10, as illustrated by FIGS. 2A to 2D.

Because of the large number of details which must be considered, the following description initially concentrates on the structure and operation of the assembly formed by the parts of the servo chain 12, with the exception of analog regulator 16 and power amplifier 17; then consideration is given to each remaining block of the system 10 shown in FIG. 1, beginning with the direction detector 24 in digital correcting chain 13. Encoder 23 may be any conventional shaft encoder so it is unnecessary to describe a representative structure for it and its operation.

Figure 2B:
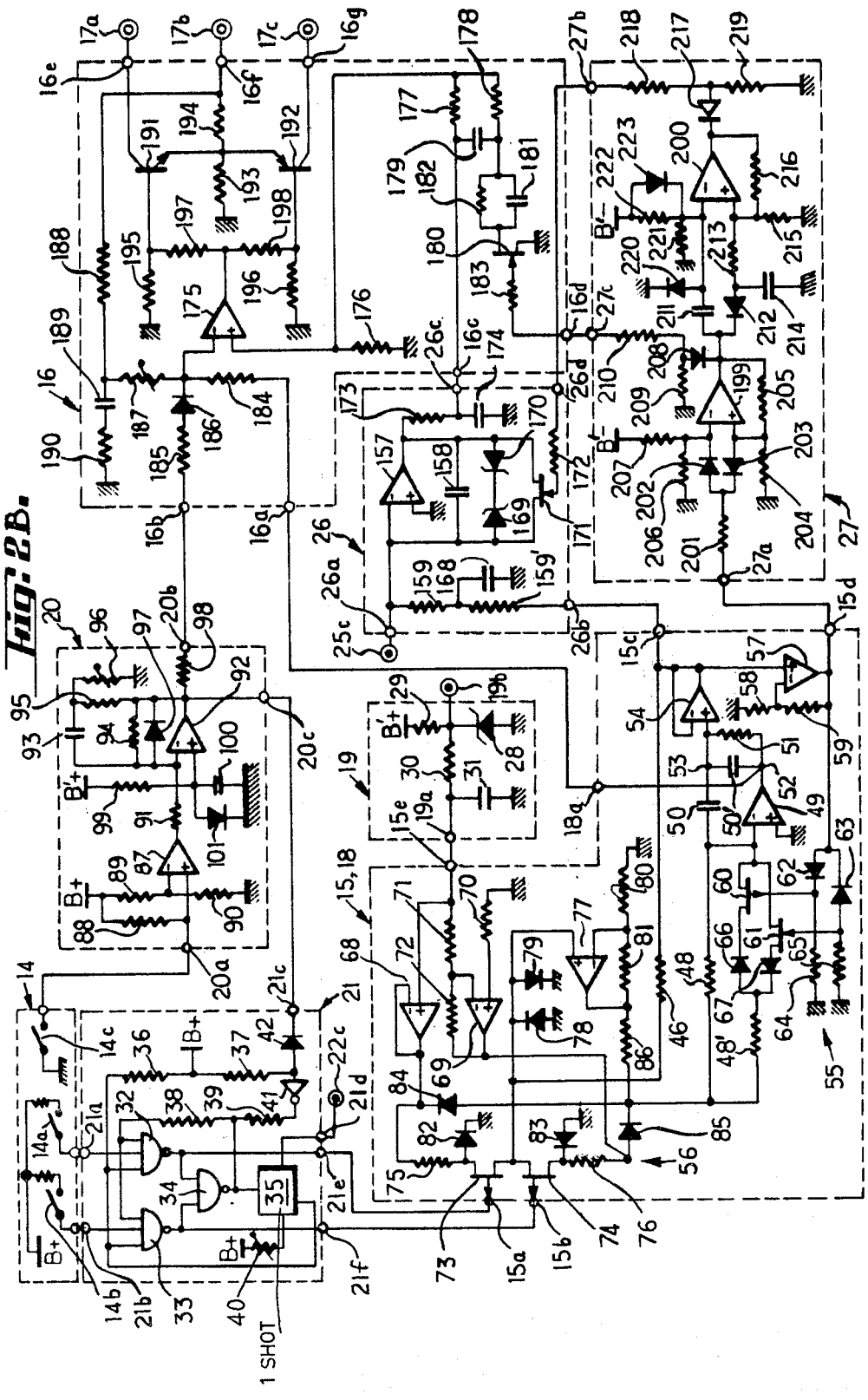

Analog chain 12, illustrated in FIG. 2B; includes: instructing member 14 with three switches 14a, 14b and 14c corresponding to the press-buttons of the member 14 in FIG. 1; operator 20 for deriving the control signal indicating high speed; the logic control unit 21 which co-operates with thermal simulation arrangement 22 (FIG. 2C) having an output terminal 22c, indicated in FIG. 2B; the generator 15 for deriving the control signal indicating normal speed, which is combined with internal drop compensating device 18; analog regulator 16; and DC reference voltage source 19.

The source of DC reference voltage 19 simply includes Zener diode 28, resistors 29 and 30 and capacitor 31. Source 19 has two output terminals 19a and 19b. The Zener diode 28 establishes a Zener voltage of 5.1 volts, and is connected in series with resistor 29 between a source of DC operating voltage B'+(+15 volts, for example) and ground of system 10. A common terminal of Zener diode 28 and the resistor 29 is on one hand connected directly to output terminal 19b of source 19 and on the other hand is connected via resistor 30 to the output terminal 19a of the source 19; terminal 19a is connected to ground by capacitor 31 and has a voltage, for example, of +4.5 volts.

One terminal of each switches 14a and 14b which correspond respectively to instructions for forward running and reverse running, is connected to a source of DC operating voltage B+(+5 volts). One terminal of switch 14c for fast running is connected to a reference potential point. The other terminals of switches 14a, 14b and 14c are connected to respective ones of three output terminals of the instruction member 14.

Logic control unit 21 has four input terminals 21a, 21b, 21c and 21d, and two output terminals 21e and 21f. Unit 21 includes three NAND gates (also termed NON-AND or NOT BOTH gates) 32, 33 and 34, a controlled delay device 35, such as a monostable multivibrator, four resistors 36, 37, 38 and 39, an adjustable resistor 40, an inverter 41, and a diode 42.

Input terminals 21a and 21b, respectively connected to switches 14a and 14b of instruction member 14, are connected to respective inputs of the two NAND gates 32 and 33. Gates 32 and 33 have common second inputs connected to the output of monostable multivibrator 35, and these inputs are also connected by resistor 36 to the source of DC operating voltage B+. Common third inputs of gates 32 and 33 are connected via resistor 39 to the output of AND gate 34 and to input terminal 21c of the input logic unit 21 via series resistor 39, inverter 41 and diode 42. The input of the inverter 41, which is coupled to the anode of diode 42, is connected via resistor 37 to the source B+. The outputs of gates 32 and 33 are connected respectively to the two output terminals 21e and 21f of the logic control unit 21, and to the two inputs of NAND gate 34, having an output connected to a signal input terminal of time delay monostable multivibrator 35. Multivibrator 33 includes a variable resistor 40 to adjust the monostable delay. Monostable 33 includes a trigger input connected via input terminal 21d to output terminal 22c of thermal simulator 22, FIG. 2C.

Generator 15 for deriving the control signal to indicate normal speed has two input terminals 15a and 15b, connected respectively to output terminals 21e and 21f of logic control unit 21, two output terminals 15c and 15d respectively coupled to error detector 26 and authorizing circuit 27, and a supply terminal 15e connected to output terminal 19a (at +4.5 volts) of reference voltage source 19. Internal drop compensating device 18 forms an integral part of generator 15 and includes an output terminal 18a. The device 18 forms the subject of the aforementioned patent application Ser. No. 914,987.

Before describing the structure of block 15, 18, FIG. 2B, it should be mentioned that, if gates 32 and 33 in logic control unit 21 did not have the pairs of common inputs (as would be possible in cases where there was no need for a delay by device 35 and where a connection between the logic control unit 21 and the speed-indicating control generator could be avoided), gates 32 and 33 would behave as inverters. Thereby the signals applied respectively to input terminals 15a and 15b of generator 15 would simply represent inverted forms of the signals which are applied by switches 14a and 14b respectively to input terminals 21a and 21b of logic unit 21.

Reference is now made to FIG. 3, a circuit diagram of the structure of generator 15 and compensating device 18. For reasons which will appear below, block 15, 18, FIG. 3, co-operates with instructing member 43 which causes motor 11 to run forward and backward. Member 43 includes two switches 44, 44' respectively connected in series between opposite polarity voltage sources B+ and B− via resistors 45 and 45'. In block 15, 18, a terminal common to switches 44 and 44' is connected to output terminal 15c of generator 15 via feed forward resistor 46. The common terminal is also connected to the direct input (+) of differential amplifier 47, having a grounded inverting input (−). The output of differential amplifier 47 is connected by resistor 48 to inverting input (−) of differential amplifier 49, having a grounded direct input (+). The inverting input of differential amplifier 49 is also connected to the amplifier output via series capacitor 50 and resistor 51. Output terminal 52 of differential amplifier 49 is connected to output terminal 18a of compensating device 18. Terminal 53, common to capacitor 50 and resistor 51, is connected to the direct input (+) of differential amplifier 54, having an inverting input (−) connected directly to its output, in turn connected to the generator output terminal 15c.

The operation of this assembly can be understood with the help of FIG. 5, which illustrates different waveforms occurring in system 10. In FIG. 5, waveform F represents the required speed indicating control signal which generator 15 is designed to emit in response to instruction signals (waveforms A and B) which are supplied by instruction member 14 (FIG. 2A) or 43 (FIG. 3) in response to actuation of the forward running switch 14a, 44 and backward running switch 14b and 44' respectively. The current which flows in motor 11 is indicated by a waveform K. From time t1, when forward running is ordered, a steady speed is reached by time t"1, whereby the interval t"1−t1 represents a predetermined starting period. AFter time t"1 the motor speed is constant until time t2 when motor 11 is ordered to stop. Hence, t2 is the beginning of a stopping period which ends at time t'2. In the general case shown, the stopping period t'2−t2 and starting period t"t−t1 differ. For reverse running (ordered in FIG. 5 between times t3 and t4) the form of speed indicating control signal F is the reverse of that of the signal formed for forward running.

It is well known that the operating current of a separately excited DC motor is high if a short time is allowed for speed increases or decreases. Because the starting period is shorter than the stopping period, the starting current is higher than the stopping current, as shown by waveform K in FIG. 5. Because of the internal resistance R of motor 11, the back emf, E, of the motor is not equal to its supply voltage, U, but varies according to a law: $E=U-RI$, where I is the armature current. The product RI represents the resistive drop, also termed the internal drop, in the voltage U. When motor 11 is turning at constant speed, the sustaining current I, and thus the resistive drop, is negligible. If on the other hand high acceleration is required, the resistive drops during the starting and stopping periods are considerable and materially interfere with the process of change. Device 18 compensates for this internal drop by adding a loss signal $S_p$ to the required speed indicating control signal (waveform F in FIG. 5) representing the voltage U supplied to motor 11. Loss signal $S_p$ corresponds to the resistive drop RI, so that the back emf $E=U+S_p-RI=U$. Thus, assuming that generator 15 emits a control signal F, as shown in FIG. 5, compensating device 18 derives signal G (FIG. 5). Signal G is the sum of signal F and a component proportional to the current I, represented by waveform K in FIG. 6, which occurs during the intervals when the motor is starting and stopping.

Returning to FIG. 3 of the drawing, the constant voltage supplied to motor 11 after start up is determined by the value of supply voltages B+ and B'1, and the values of resistors 45 and 45' and resistor 46. The periods required for motor 11 to start up and stop are set by the circuit including components 47–54, connected in parallel with resistor 46. In this circuit, differential amplifier 47 acts as a buffer, while differential amplifier 49 acts as an integrator by virtue of capacitor 50 and resistor 48. Consequently, the gradient of signals F and G in the starting and stopping intervals is determined by the values of resistor 48 and capacitor 50. In the present general case, where the starting and stopping intervals are different, the integration constant in question must be altered accordingly for the starting and stopping intervals. In the example being described where the starting interval is shorter than the stopping interval, the stopping time constant is determined by resistor 48 and capacitor 50, while the shorter starting up time constant is obtained by reducing the value of resistor 48 by shunting it with an additional resistor 48'. Since terminal 53 is connected directly to the input of differential amplifier 54; amplifier 54 supplies terminal 15c with the required stopping portions of control signal F for motor 11 during transient conditions (starting and stopping). During transient and steady state conditions, a constant voltage, determined by resistor 46, is supplied to terminal 15c. The compensating arrangement 18 of FIG. 3 is provided merely by adding resistor 51 between terminals 52 and 53. Because (1) the internal voltage drop in the motor is proportional to the current flowing through it, (2) the motor current is inversely proportional to the starting and stopping periods, and thus to the integration time constant of differential amplifier 49, and (3) the current in resistor 48 (which determines the stopping time constant) or in resistors 48 and 48' (which determine the starting time constant) is the same as that flowing in resistor 51, the voltage between terminals 52 and 53 is proportional to the current flowing in the motor. By adjusting the value of the resistor 51 so that the voltage between terminal 52 and 53 is equal to the internal voltage drop RI in the motor, this internal drop can be simulated. It can also be seen from FIG. 3 that the voltage between terminals 52 and 53, which represents the internal motor drop, is added to the integrated voltage which represents the gradient of signal F during the starting and stopping intervals, so that the voltage at terminal 18a during operation is as illustrated by waveform G in FIG. 5.

Block 15, 18, FIG. 2B represents an actual circuit based on the general diagram shown in FIG. 3. Thus, the components which are common to FIG. 2B and FIG. 3 have the same reference numerals in FIG. 2B. The two main differences in FIGS. 2B and 3 are (1) that decoupling capacitor 50', connected in parallel with resistor 51 to simulate the internal drop, is added and (2) that there is a switching arrangement 55 which connects or disconnects resistor 48', depending upon whether the motor is starting or stopping. In addition, in FIG. 3 block 15, 18 is controlled by an instructing member 43 which produces positive or negative signal depending upon whether the motor is required to run foward or backward. Therefore, because in FIG. 2B like polarity signals arrive at input terminals 15a and 15b of block 15, 18 (waveforms D and E in FIG. 5) in response to instructing signals (AB in FIG. 5), block 15, 18 contains an input circuit 56 which derives the positive and negative voltages required for forward and backward running speed control. The positive and negative voltages are directly coupled to resistors 46, 48, 48'.

Switching arrangement 55 is of simple construction. The output signal at terminal 15c is applied to a direct input (+) of differential amplifier 57, having an inverting input (−) grounded through resistor 58 and connected to the output of the amplifier via resistor 59. The output of amplifier 57 is connected to output terminal 15d and to a pair of circuits provided to bias field effect transistors 60 and 61 of opposing types. The two biasing circuits comprise respectively two diodes 62, 63 connected in series with respective ones of grounded resistors 64 and 65, as illustrated in FIG. 2B. The gates of transistors 60 and 61 are connected respectively to the common terminals of diodes 62 and 63 and resistors 64 and 65. Source electrodes of transistors 60 and 61 are connected to the inverting input (−) of differential amplifier 49, while the drains thereof are respectively connected to one end of resistor 48' via series connected diodes 66, 67 which are biased to conduct current in the same direction as their associated transistors.

In input circuit 56 of block 15, 18, a reference voltage is derived from supply terminals 15e, which is connected to output terminal 19a (+4.5 volts) of the DC reference voltage source 19. An impedance matching circuit 68 is connected to terminal 19a to derive a positive, output reference voltage (+4.5 volts). The matching circuit 68 includes a differential amplifier having a direct input (+) connected to supply terminal 15e and an inverting input (−) directly connected to its output. Another matching circuit 69 converts the positive reference voltage at terminal 15e into a negative voltage of the same value (−4.5 volts). Matching circuit 69 is also a differential amplifier, having a direct input grounded through a resistor 70 and an inverting input connected to terminal 15e via a resistor 71 and to the amplifier output via a resistor 72.

Input circuit 56 comprises two like conducting type field effect transistors 73, 74 having gates respectively connected to input terminals 15a and 15b. The drains of transistors 73, 74 are respectively connected by resistors 75 and 76 to the outputs of the matching members 68 and 69 while the sources of the transistors have a common connection to resistor 46 and to the direct input of a differential amplifier 77. The connection to the direct input of amplifier 77 is shunted to ground by back to back diodes 78 and 79. The inverting input of differential 77 is grounded by resistor 80 and is looped to its output via resistor 81. Diodes 82, 83 respectively connect the drains of transistors 73, 74 to ground, while diodes 84, 85 connect the outputs of matching circuits 68 and 69 respectively to a junction for resistors 48 and 48' and to the output of differential amplifier 77 via a resistor 86. Diodes 84 and 85 are connected in such a way as to limit the maximum voltage applied to resistors 48 and 48'.

Thus, if the voltage applied to terminal 15b changes to a zero value (waveform E FIG. 5) to order motor 11 to run in reverse, the voltage at output terminal 18a changes as determined by the values of the reference voltage at terminal 15e and resistors 76 and 46. In response to this order, the common terminal of the sources of transistors 73 and 74 is increased to a negative potential which is limited by the junction voltage of diode 78. In this way, the switching arrangement 55 connects transistor 61 into the circuit during starting up. The conduction of differential amplifier 49 changes as a function of the integration time constant established by capacitor 50 and the parallel resistors 48 and 48'. When the output level is reached, the potential at the common terminal for the sources of transistors 73 and 74 becomes zero again.

Figure 2C:
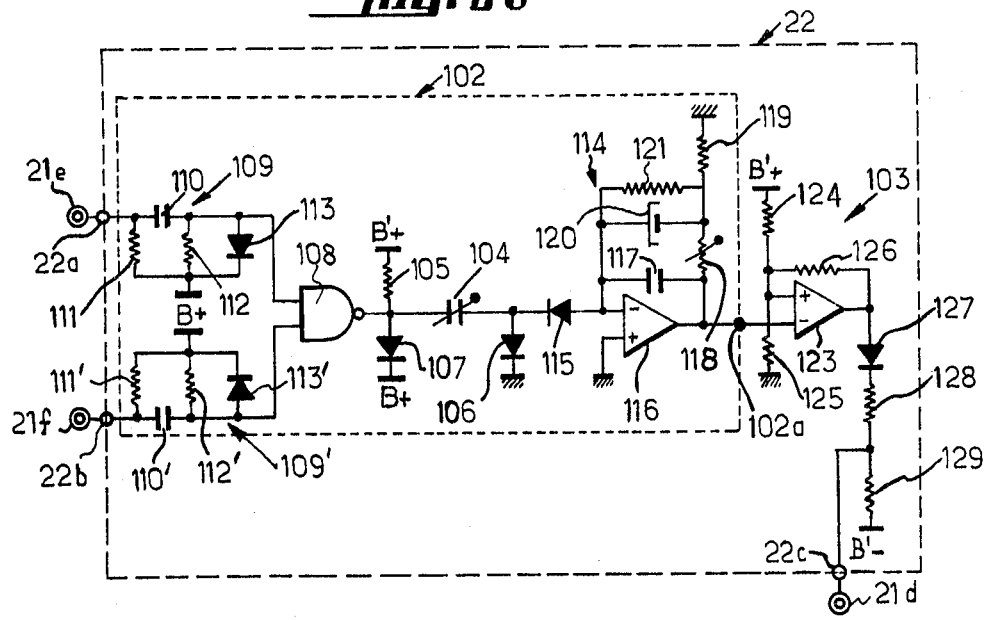
Figure 3:
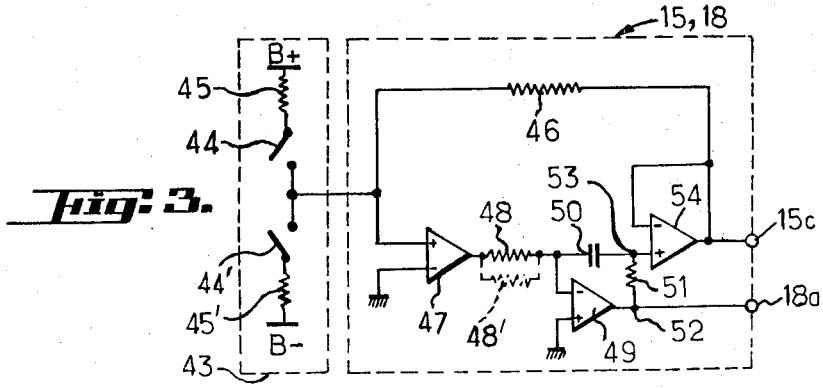
FIG. 3 is a circuit diagram of a speed control signal generator which compensates for the internal motor armature drop.

The operation of the logic control unit 21 until now be described in conjunction with generator 20, (FIG. 2B) that derives the high speed control signal and thermal simulation block 22 (FIG. 2C).

Generator 20 has an input terminal 20a and two output terminals 20b and 20c. Input terminal 20a is connected to switch 14c of instructing member 14. Terminal 20a is connected to the direct input (+) of differential amplifier 87 and by resistor 88 to a source of operating voltage B+. The inverting input (−) of amplifier 87 is connected to a common junction of resistors 89 and 90, connected in series between the source B+ and ground. The output of amplifier 87 is connected by resistor 91 to the inverting input (−) of a second differential amplifier 92. Amplifier 92 is formed as a semi-integrator by a feedback loop connected between its inverting input and its output; the feedback loop comprises a capacitor 93, three resistors 94, 95 and 96, and diode 97. Resistors 95 and 96 connect the output of amplifier 92 to ground and have a common point connected to the inverting input of amplifier 92 via capacitor 93. Diode 97 shunts resistor 94 and both are connected between the inverting input of amplifier 92 and its output. The output of amplifier 92 is connected by resistor 98 to output terminal 20b of generator 20 and it is directly connected to output terminal 20c. Finally, the direct input (+) of amplifier 92 is connected to a common terminal of resistor 99 and capacitor 100, shunted by diode 101; these components are connected between voltage source B'+ (+15 volts) and ground.

Normally, generator 20 supplies analog regulator 16 with a control signal for the fast rewind speed for the tape driven by the motor 11, with allowance being made for the accelerating and braking abilities of the motors and the spools associated with the tape.

Figure 7:
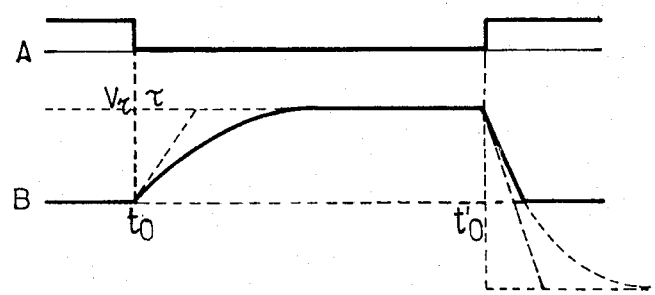

In FIG. 7, waveforms A and B respectively represent the input signal applied to terminal 20a of generator 20 and the generator output signal at terminal 20b. The signal at terminal 20c is identical to waveform B but of a different magnitude.

The inverting input of differential amplifier 87 sets the reference voltage for the amplifier operation. Normally, when switch 14c of the instructing member 14 is open, only resistor 88 supplies the direct input (+) of differential amplifier 87. This steady state produces a fixed voltage, taken as a zero reference, at the output of semi-integrator differential amplifier 92, having a variable integration time constant, adjusting the value of resistor 96. When, at time t0, the operator actuates switch 14c to call for fast rewinding of the tape associated with motor 11, the voltage at the input terminal 20a drops to zero, as indicated in FIG. 7. The conduction of differential amplifier 87 is translated by semi-integrating amplifier 92 into a signal having a waveform B, FIG. 7. The rise time of waveform B changes as a function of the integration time-constant $\tau$, which is adjustable by means of resistor 96. Resistor 98 sets the maximum voltage $V_r$ (FIG. 7) which corresponds to the rated fast rewind speed. When, at time t'0, the operator orders termination of fast rewind, the voltage at terminal 20a returns to the positive starting voltage by reason of resistor 88. The positive starting voltage is converted by differential amplifier 87 and semi-integrating amplifier 92 into a voltage drop that is limited in magnitude by diode 101, which compensates for the effect of diode 97.

The effect of the signal generated by generator 20 on logic control unit 21 is as follows. Logic unit 21 receives at its input terminal 21c the direct output signal from semi-integrating amplifier 92. Before time t0, when fast rewind is commanded, the inputs of NAND gates 32 and 33 have a common connection to terminal 21c by components 37, 38, 39, 41 and 42, which are biased to enable the gates. These commoned inputs are thus set to the logic 1 state. When the signal present at the output terminal 20c of generator 20 changes in a positive direction, as indicated by waveform B, FIG. 7, diode 42 and inverter 41 drive the common inputs of gates 32 and 33 to a logic 0 level, to inhibit these gates. At the same time, the signal input of the delay device 35 is maintained at the same logic 0 level, which is the normal state for this input when the logic control unit 21 is quiescent.

The action of delay device 35 is now explained by describing the generation of the control signal for it; the control signal is received via terminal 21d from the output 22c of terminal 22, FIG. 2C. More complete details of such a block are found in the aforementioned patent application Ser. No. 932,634.

Simulator 22 has an output terminal 22c and two input terminals 22a and 22b, connected respectively to output terminals 21e and 21f of logic control unit 21. Simulator 22 includes a thermal simulation arrangement 102 connected to input terminals 22a and 22b, and a threshold circuit 103 having an input connected to output 102a of the thermal simulation arrangement 102 and an output connected to terminal 22c.

Thermal simulation arrangement 102 comprises in essence a variable capacitor 104 that is charged by a series path including resistor 105 and a diode 106, connected between the source of operating voltage B'+ (+15 volts) and ground. A common terminal for resistor 105 and capacitor 104 is connected to the source B+ (+5 volts) by a diode 107 and to the output of NAND gate 108, having two inputs respectively connected to input terminals 22a and 22b of simulator 22 via control pulse generating circuits 109 and 109'. Each generator circuit 109 and 109' is fed by the source B+ and includes a capacitor 110, 110', two resistors 111, 112, 111', 112' and a diode 113, 113'. Capacitors 110 and 110' respectively connect input terminals 22a and 22b to the two inputs of NAND gate 108; electrodes of capacitors 110 and 110' are respectively connected to pairs of resistors 111, 112 and 11', 112', which are connected in common to the source B+. Diodes 113 and 113' shunt resistors 112 and 112' to limit the voltage at each input of NAND gate 108.

A common terminal for diode 106 and capacitor 104 is connected to output terminal 102a of thermal simulation arrangement 102 via a semi-integrating amplifier 114. This common point is connected to the cathode of diode 115, having an anode connected to the inverting input terminal of differential amplifier 116, having a grounded direct input. The output terminal of differential amplifier 116 is connected to output terminal 102a and is looped back to the inverting input terminal of the amplifier via a capacitor 117 and connected to ground via variable resistor 118 and a fixed resistor 119. A common terminal for resistors 118 and 119 is connected to the inverting input terminal of differential amplifier 116 by parallel capacitor 120 and resistor 121. Capacitor 117 in the semi-integrating amplifier 114 prevents undesirable amplifier oscillation.

In response to each of the order pulses from the logic control unit 21, simulation arrangement 102 alters the charge on capacitor 104 in a manner proportional to the square of the speed of rotation and to the reciprocal of at least one of the starting and stopping periods $t_d$ and $t_a$. Also simulation arrangement 102 causes semi-integrating amplifier 114 to react, as a function of the inherent electrical, thermal and mechanical characteristics of the motor 11, to alterations in the charge of capacitor 104. Thereby, at terminal 102a there is derived a DC voltage for the thermal simulation of the motor.

Heating W of motor 11, which operates at substantially constant load, is given by $$W = F \left[ C_1 V^2 \left( \frac{1}{t_a} + \frac{1}{t_d} \right) \right] \left[ C_2 R_m R_t \frac{J^2}{K_T^2} \right]$$

where F is the frequency of the operating cycles of the motor, $C_1$ and $C_2$ are constants, $R_m$ and $R_t$ are respectively the electrical resistance and thermal resistance of the motor, J is the inertia of the motor and of the capstan which it drives, and $K_T$ is the torque constant of the motor. In the simulator 23 shown in FIG. 2C, capacitor 104 has a value proportional to the first bracketed term in the above equation, and the semi-integrating amplifier 114 has a gain proportional to the second bracketed term in the equation. Capacitor 120 and resistor 121 produce a delay representative of the motor thermal time-constant, which is shorter for better ventilated motors.

Threshold circuit 103 in simulator 22 comprises a differential amplifier 123 having an inverting terminal directly connected to output terminal 102a of thermal simulation arrangement 102 and a direct input terminal connected to a tap between operating voltage source B'+ and ground. The tap between resistors 124, 125 is also connected to the output of differential amplifier 123 by resistor 126. The output of amplifier 123 is also connected to another source of operating voltage B'— via diode 127 and series resistors 128 and 129, having a tap connected to output terminal 22c of simulator 22.

The operation of simulator 22 and logic control unit 21 will be clear from the following description.

Initially switches 14a and 14b of instructing member 14 are open, so output terminals 21e and 21f of logic control unit 21 are at the 1 level. In addition, resistors 112 and 112' of generating circuits 109 and 109' of simulation arrangement 102 supply a logic 1 to each input of NAND gate 108. Hence, the voltage at the output of gate 108 is determined by resistor 105 and the diode 107 which connect supply source B+ and B'+, whereby capacitor 104 is initially charged in a predetermined fashion.

At time $t_1$ (FIG. 5) the operator closes forward running switch 14a. A logic 1 is thereby applied to the input terminal of NAND gate 32, the output of which drops to the logic 0 level. The voltage drop at the output of NAND gate 32 is differentiated by control pulse generating circuit 110, whereby a logic 0 is supplied to one input of NAND gate 108. This results in the output of the NAND gate changing from 0 to 1 to discharge capacitor 104. This discharge is supplied by diode 115 to semi-integrating amplifier 114 to charge capacitor 120, having a value which represents the thermal time-constant of motor 11. The signal at output 102a of amplifier 140 thus changes in a positive direction in conformity with the second term of the above equation, i.e. in conformity with the inherent electrical, thermal and mechanical characteristics of motor 11 and the members which it drives. In this way, the DC voltage at output 102a of the simulation arrangement 102 simulates the temperature of motor 11 in conformity with the above mentioned equation.

In the example illustrated, circuit 110 for generating the control signal for gate 108 causes the input of the gate to return relatively quickly to the original logic 1 state. When the gate 108 input returns to the logic 1 state the gate output returns to the logic 0 state so capacitor 104 charges through resistor 105 and diode 106 to a level which is preset by the voltage B'+.

If the operator again orders motor 11 to run when capacitor 104 has not yet returned to its original charge, the capacitor discharge will be greater than normal and will cause a corresponding increase in the DC simulation voltage at output terminal 102a. Also, if the orders from the operator occur at an excessive frequency, the DC simulation voltage at terminal 102a will exceed a predetermined temperature threshold, represented in FIG. 2C by the ratio between the values of resistors 124 and 125 in the threshold circuit 103. The output from threshold circuit 103 will then change to trigger monostable multivibrator delay device 35. The output of device 35 will inhibit NAND gates 32 and 33 of logic control unit 21 for a length of time, set by adjustable resistor 40, such that the temperature of the motor can drop to a permitted level. NAND gates 32 and 33 are inhibited in response to a logic 0 being supplied to the common inputs of the two gates. The common inputs are normally set at the logic 1 level by the voltage source B+ and resistor 36.

In FIG. 5, the portions of waveforms D and E shown in heavy continuous lines respectively represent the signals derived at output terminals 21e and 21f of logic control unit 21 in response to run forward and reverse orders which are given by the operator actuating switches 14a and 14b. Waveforms A and B in FIG. 5 are derived at terminals 21a and 21b of logic unit 21. The broken line portions added to waveforms D and E in FIG. 5 show the effect of the delay applied by device 35 of logic control unit 21. The broken line portions represent the delay between the time the order is given to run forward (at time $t_1$) or to run in reverse (at time $t_3$) and motor 11 actually starts; the delay is of the same duration in both cases.

A description will now be given to details of digital correcting chain 13 by referring to FIG. 2A wherein circuit diagrams for direction detector 24 and the increment generator 25 are illustrated and FIG. 2B wherein there is illustrated a circuit diagram of error detector 26. In FIGS. 2A to 2D, encoder 23 is not shown since its structure is familiar to one skilled in the art. Encoder 23 supplies signals represented by waveforms A and B or A' and B', FIG. 6, to inputs 24a and 24b of the direction detector 24. The signals illustrated are pulses or squarewaves having 50% duty cycles. Rotation in the forward direction causes the phase of waveform A to be advanced relative to that of signal B; conversely, rotation of motor 11 causes waveform A' to a phase lag in relation to waveform B'.

Direction detector 24 is also a frequency doubler. Detector 24 includes fourteen NAND gates 130 to 143 and two capacitors 144 and 145. The input terminal 24a is connected to one input of gates 134, 139 and 133, and to both inputs of gate 130, which thus acts as an inverter. Similarly, terminal 24b is connected to one input of gates 137 and 142, and to the second input of gate 133 and to both inputs of gate 132, which thus acts as an inverter. The outputs of inverters 130 and 132 are respectively connected to second inputs of gates 137 and 142 on the one hand and to gates 139 and 134 on the other hand. The outputs of inverters 130 and 132 also are connected to the two inputs of gate 131, having an output connected to ground via capacitor 144 and to one input of each of gates 135 and 141. The output of gate 133 is connected to ground via capacitor 145 and to a first input of each of gates 136 and 140. Third inputs of gates 134 and 142 are respectively responsive to the outputs of gates 135 and 141, having second inputs looped to the outputs of gates 134 and 142 which also respectively drive one input of gates 138 and 143. In addition, gates 137 and 139 have third inputs respectively connected to the outputs of gates 136 and 140, having inputs looped to the outputs of gates 137 and 139 and connected to the second inputs of gates 138 and 143.

The outputs of latter gates 138 and 143 form the outputs 24c and 24d of the direction detector 24.

If the input terminals 24a and 24b receive waveforms A and B in FIG. 6 which correspond to forward rotation, the signal present at the output terminal 24c is presented by waveform C in FIG. 6, while no signal appears at terminal 24d, as illustrated by waveform D in FIG. 6. The rising and decaying edges of signal C correspond to the edges of signals A and B and the frequency from the encoder 23 is thereby doubled. On the other hand, if motor 11 runs in reverse, no signal is derived at terminal 24c, as indicated by waveform C', while waveform D', similar to waveform C, is derived at terminal 24d.

Detector 24 does not include any multivibrators, particularly monostable multivibrators, so that its operation is independent of the frequency from encoder 23. Another advantage of direction detector 24 is that the rotation direction signals have a frequency twice that of encoder 23, which improves the sampling and provides servocontrol system 10 with improved accuracy and a better response time.

Before describing the structure and operation of increment generator 25 and error detector 26, respectively shown in FIGS. 2A and 2B, reference is made to FIG. 4 wherein the general structure of these two members is illustrated. The increment generator 25 of FIG. 4 is only designed for forward running. Input 25a of FIG. 4 is therefore intended to be connected to output terminal 24c of the direction detector 24. Increment generator 25 in FIG. 2A thus has a second input 25b to receive the reverse running waveform D' (FIG. 6) from terminal 24d.

Generator 25 of FIG. 4 has two output terminals 25c and 25d. Input terminal 25a and output 25c are connected together by two parallel paths, one path contains series connected capacitor 146 and diode 147, and the second path contains, in seriatim, inverter 148, capacitor 149 and diode 150. Common terminals of capacitors 146 and 149 and diodes 147 and 150 are respectively connected to the output terminal 25d by diodes 151 and 152 which are biassed in the opposite direction from diodes 147 and 150. In the first path, terminal 25a is connected to the junction of resistor 153 and diode 154, which together are connected in series between the source of operating voltage B'+ and a source of reference voltage VO. Similarly, in the second path the junction of inverter 148 and the capacitor 149 is connected to a common terminal for resistor 155 and diode 156, which are connected in series between the sources B'+ and VO.

Error detector 25, shown diagrammatically in FIG. 4, has two input terminals 26a and 26b and an output terminal 26c. Detector 26 includes differential amplifier 157 having a grounded direct input and an inverting input connected to input terminal 26a and looped to the amplifier output via capacitor 158. Input terminal 26a is connected to output terminal 25c of the increment generator 25, while the input terminal 26b is connected to output terminal 15c of generator 15 for deriving the control signal for normal speed. Terminal 15c is connected to inverting input terminal of differential amplifier 157 by a resistor 159. The output of amplifier 157 forms the output terminal 26c of the error detector 26.

A subsidiary characteristic of the servocontrol system is tachometer 160, FIG. 4, which is responsive to the signal at output terminal 25d of increment generator 25. The tachometer 160 has an input terminal 160a connected to the output terminal 25d of the increment generator 25 and an output terminal 160b which derives a DC voltage representing the rotation speed of the motor. Tachometer 160 includes differential amplifier 161 having an output connected to output terminal 160b. Amplifier 160 has a direct input connected to ground and an inverting input connected to input terminal 160a and looped to the amplifier output by resistor 162, shunted by capacitor 163.

In considering the operation of the combination shown in FIG. 4, it should be recalled that increment generator 25 supplies error detector 26 and tachometer 160 with constant voltage pulses in response to each edge of each pulse applied to input terminal 25a or 25b. In addition, when either direction of rotation is possible, the polarity of the pulses supplied by the increment generator 25 is representative of the rotation direction.

The "high" level of the increments produced by the generator 25 is determined by the reference voltage $V_O$ (taken for example from terminal 19b of the reference voltage source 19) to which is added the voltage drop in diode 154 in the case of the first path and that in diode 156 in the case of the second path. The resistors 153 and 155 provide for a return to this voltage level when capacitors 146 and 149 respectively recharge.

In response to the leading, positive going edge of signal C, FIG. 6, at input terminal 25a, capacitor 146 charges through resistor 153, diode 147 and the capacitor 158 in the error detector 26. Capacitor 158 causes differential amplifier 157 to operate as an integrator. The charge stored by capacitor 146 is equal to that fed through capacitor 158.

In response to the next negative going edge at terminal 25a, capacitor 146 discharges through resistor 162, diode 151 and terminal 25a. However, because of inverter 148, capacitor 149 charges capacitor 158 via diode 150. Because each edge of the input signal to increment generator 25 has an effect on capacitor 148 and direction detector 24 doubles output frequency of encoder 23, capacitor 158 receives four charges for each step of the encoder. Hence, the four charges are equivalent to the repetition frequency of the pulses of the signals applied to terminals 24a and 24b of the direction detector (signals A and B or A' and B'). Similarly, in response to each step of encoder 23, resistor 162 in tachometer 160 is supplied with a current, which is filtered by capacitor 163. The current in resistor 162 is proportional to the frequency at which the signal edges appear at input terminal 25a. In this way, tachometer 160 derives from its output 160b a DC analog voltage proportional to the motor rotation speed. Because tachometer 160 is connected with increment generator 23, FIG. 2A, the tachometer produces an output signal having a polarity representative of the motor rotation direction.

The relative times of the rising and trailing edges at the terminal 25a indicate the rotation of encoder 23 and the capstan, which are driven by motor 11 in conformity with the control signal supplied by generator 15. In other words, the control signal changes simultaneously with the appearance of the edges at terminal 25a. Consequently, generator 15 draws a current conforming to the control signal (waveform F in FIG. 5 for example) from capacitor 158, via resistor 159 connected to output 15c. This current, which indicates the theoretical speed of motor 11, also corresponds to the current for the desired movement of motor 11, that is, the number of steps indicated by the encoder 23 which the motor should make per unit of time. The current supplied to capacitor 158 by capacitors 146 and 149 and diodes 147 and 150 represents the actual movement of the motor. Thus, if the actual and theoretical positions of the motor are the same, the amount of current added to capacitor 158 equals the current subtracted from the capacitor by generator 15, whereby the mean value of the output signal from the error detector 26 remains constant. Conversely, when the actual position deviates from the theoretical position, the subtraction and addition are not equal and give rise to a residue which is reflected at output 26c of differential amplifier 157. If for example the actual position is short of the theoretical position, the current added to capacitor 158 is less than the amount subtracted by generator 15, with the result that the signal at output 26c of the detector has a positive change proportion to the angular positional error.

In FIG. 2A, increment generator 25 is designed for both forward and reverse running and thus contains two circuits substantially identical to circuit 25 of FIG. 4. Hence, the components which perform the same functions in the generators 25 illustrated in FIG. 2A and FIG. 4 respectively bear the same reference numerals; the components responsible for processing the signals having to do with running in reverse being marked with the index "'".

The only difference between the circuits dealing with forward running and reverse running lies in the reversal of the conduction direction of diodes 147, 150, 151, 152, because increment generator 25 supplies error detector 26 and tachometer 160, via its output terminals 25c and 25d respectively, with pulses having a polarity indicative of the rotation direction of motor 11.

In the practical embodiment shown in FIG. 2A, a voltage equivalent to voltage VO of FIG. 4 is derived at output terminal 19b (+5.1 volts) of reference voltage source 19 (FIG. 2B). For reasons which will be seen below, the voltage at output terminal 19b of the source 19 biases the bases of transistors 164 and 164' via voltage dividers formed by pairs of resistors 165, 166, 165', 166', connected in series between terminal 19b and earth. Resistors 166 and 166' are decoupled by capacitors 167, 167'. The collectors of transistors 164 and 164' are grounded while emitters thereof connect together the cathodes of diodes 154 and 156 on the one hand and diodes 154' and 156' on the other hand.

Resistors 165 and 165' are adjustable so that voltage VO can be matched to each direction of rotation to compensate for variations in the values of components of increment generator 25 which supplies capacitor 158 in error detector 26; typically these components are capacitors 146 and 149, and 146' and 149'. To improve accuracy, these capacitors are advantageously selected to have only very slight drift with temperature. Also, the base-emitter voltage of transistor 164, in conjunction with the junction voltage of diode 154, compensates the junction voltages of diodes 147 and 151. The same applies to the other diodes (150 and 152 compensated by diode 156, 147' and 151' by diode 154', and 150' and 152' by diode 156').

Error detector 26, FIG. 2B, includes components with the same designations as shown in FIG. 4. Differential amplifier 157 is associated with capacitor 158 and subtracting resistor 159 is associated with resistor 159' and filter capacitor 168. In addition, in error detector 26 of FIG. 2B, capacitor 158 is shunted on the one hand by series connected Zener diodes 169, 170 having commonly connected cathodes, and on the other hand by the drain-source circuit of a field effect transistor 171, having a gate connected by resistor 172 to input terminal 26d of error detector 26; terminal 26d is connected to output terminal 27b of authorizing block 27. The output of differential amplifier 157 is connected to output terminal 26c of error detector 26 via a filter network including resistor 173 connected in series with grounded capacitor 174. Common junction of resistor 173 and capacitor 174 forms output terminal 26c of error detector 26.

Zener diodes 169 and 170 limit the positive and negative-going excursions of the output signals from differential amplifier 157 to a voltage level determined by the Zener voltage of one of them added to the forward voltage drop in the other. Typically diodes 169 and 170 are silicon diodes with Zener voltages of 5.1 volts, to limit the excursions to approximately ±5.7 volts.

In the embodiment illustrated, transistor 171 reduces the voltages at the output of error detector 26 to zero in the following cases: after the theoretical halt of the capstan, by reason of the control signal supplied by generator 15, transistor 171 reduces the output of error detector 157 to zero after a certain period of time which enables the tape to settle down so that it no longer exerts any rotational force. The positional servocontrol can then be eliminated. Secondly, transistor 171 causes a brief delay in the operation of error detector 26 after the order for motor 11 to start, since the initial information from direction detector 24 may be incorrect. In effect, at the time of starting, direction detector 24 (which is a sequential logic circuit) only supplies the desired signals after analyzing the information of at least one encoder step. Thirdly, and finally, transistor 171 prevents error detector 26 from functioning during high speed operation of motor 11. Transistor 171 is actuated accordingly by authorizing block 27, described infra.

Unless transistor 171 is operating to inhibit error detector 26, positional error signals derived for normal speed operation of motor 11 are filtered by network 173, 174 before being applied to output terminal 26c of the error detector.

A particularly important point concerning increment generator 25 and error detector 26 shown in FIGS. 2A and 2B is that the actual speed of motor 11 at normal speed does not depend upon the reference voltage derived from terminal 19b of source 19; instead, the motor speed depends only on particularly stable passive components including capacitors and resistors (146, 149, 159 for example). If the circuit diagram of FIG. 4 is considered, the amplitude of the current charging capacitor 158, which represents the actual speed of motor 11, is expressed by $I_r = 4.F.C.\ V_O$, where $I_r$ is the amplitude of this current during one repetition cycle of encoder 23, F is the frequency of the output signals from the encoder, C is the capacitance of capacitor 146 or 149 (the capacitance of these capacitors being substantially identical), and VO is the reference voltage shown in FIG. 4. The number 4 in the equation simply means that in one repetition period of the signal from encoder 11, capacitor 158 is charged four times, because direction detector 24 is a frequency doubler and increment generator 25 reacts to each edge of the signals derived by the direction detector. It can also be inferred from FIG. 4 that the amplitude $I_t$ of the current supplied by capacitor 158 to generator 15, which represents the theoretical speed for motor 11, is expressed by the formula $I_t = K.\ VO/R$, where R is the value of resistor 159 and K is a constant determined by generator 15 as a function of the required speed of motor 11. When the actual and theoretical speeds agree, $I_r = I_t$, whereby $F = K/4$ C.R.

Analog regulator 16, FIG. 2B, has four input terminals 16a to 16d and three output terminals 16e, 16f, 16g. Input terminal 16a receives from terminal 18a of internal drop compensating arrangement 18 the compensated control signal (G in FIG. 5). Terminal 16b receives the high speed control signal generated at terminal 20b of generator 20. Input terminal 16c is connected to output terminal 26c of error detector 26, while input terminal 16d is connected to a second output terminal 27c of authorizing block 27. Output terminals 16e, 16f and 16g are respectively connected to input terminals 17a, 17b and 17c of power amplifier 17, FIG. 2D.

Analog regulator 16 contains a differential amplifier 175, having a direct input, is connected to ground via resistor 176 and to input terminal 16c via a resistor 177 which is shunted by a series resistor 178 and a capacitor 179. A common terminal of resistor 178 and capacitor 179 is connected to the drain of field effect transistor 180 by capacitor 181 shunted by resistor 182. The source and gate of transistor 180 are respectively grounded and connected to input terminal 16d by resistor 183.

The inverting input of differential amplifier 175 is connected to input terminal 16a via resistor 184; to input terminal 16b via resistor 185 and a diode 186; and via resistor 187, to a common terminal for resistor 188 and capacitor 189, which is grounded via resistor 190. Resistor 188 is connected to output terminal 16f of the analog regulator 16. The output of differential amplifier 175 is connected to the input of a pre-amplifier including opposite conductivity type bipolar transistors 191 and 192. The emitters of transistors 191 and 192 are connected to a common terminal of grounded resistor 193 and resistor 194, which is also connected to output terminal 16f. The collectors of transistors 191 and 192 are respectively connected directly to output terminals 16e and 16g while the bases thereof are respectively grounded via resistors 195, 196. The bases of transistors 191 and 192 are driven in parallel by the output of differential amplifier 175 via resistors 197 and 198.

Analog regulator 16 acts as an interface between the control signal for the required speed and the back emf of separately excited DC motor 11. Regulator 16 thus multiplies the control signal for the required speed, as derived by generators 15, 20 by a coefficient which matches the regulator output to the back emf of the motor used. This coefficient is set by adjusting the value of variable resistor 187. Resistors 188 and 190, and capacitor 189, which is preferably adjustable, cancel out the inductive effects of motor 11, which occur when the voltage is commutated.

In addition, the direct input of differential amplifier 175 receives the correcting signal derived from error detector 26 in digital correcting chain 13. The output voltage of error detector 26 is applied to resistor 177 which passes the DC error signal component; series capacitor 179 and resistor 178 respond to the error signal AC component. However, to ensure stable operation of differential amplifier 175 when motor 11 is stopping, transistor 180 is controlled by authorizing circuit 27 so it conducts while the motor is stopping, to attenuate the error signal AC component which flows through capacitor 179 and resistor 178 and which under normal circumstances is supplied to the direct input of differential amplifier 175. Hence, transistor 180 reduces the dynamic gain of differential amplifier 175 while motor 11 is stopping to avoid any undesirable oscillation. Amplifier 175 thus has different transfer functions when motor 11 is starting and turning at constant speed, and when the motor is stopping.

The above description clearly indicates the purpose of authorizing block 27 which has an input terminal 27a and differential amplifiers 199 and 200 which respectively drive output terminals 27b and 27c. Terminal 27a is connected to the output of differential amplifier 57 of generator 15, and thus receives a signal as illustrated by waveform F, FIG. 5. Both inputs of differential amplifier 199 are connected to input terminal 27a via a resistor 201 and parallel, back-to-back diodes 202 and 203, so the amplifier is a full wave rectifier. The direct input of amplifier 199 is grounded via resistor 204 and is looped to its output via a resistor 205. The inverting input of amplifier 199 is connected to a tap of a voltage divider formed by series resistors 206 and 207, connected between ground and a source of operating voltage $B'-$. The output of amplifier 199 is connected to output terminal 27c via resistor 210 and a diode 208 having an anode grounded through resistor 209 so only negative voltages are applied to the gate of transistor 180 of error detector 26.

The full wave rectified output of differential amplifier 199 is coupled to the inverting input of differential amplifier 200 via capacitor 211 and to the direct input of amplifier 200 via series diode 212 and resistor 213, having a common terminal shunted to ground via capacitor 214. The direct input of amplifier 200 is also grounded via resistor 215 and is looped to the amplifier output via resistor 216. The output of amplifier 200 is coupled via diode 217 to the common terminal of resistors 218 and 219, connected in series between ground and output terminal 27b. In addition, the inverting input of amplifier 200 is grounded via diode 220, and connected to a voltage divider formed by resistors 221 and 222, connected in series between ground and voltage source $B'-$, with resistor 222 being shunted by diode 223.

To render transistor 180 of analog regulator 16 conductive and attenuate the AC error component derived from detector 26 while motor 11 is ordered to stop, differential amplifier 199 and diodes 202 and 203 rectify the required speed control signal amplified by differential amplifier 57 and supplied to input terminal 27a of authorizing block 27.

Transistor 171 in error detector 26 is controlled by differential amplifier 200 to delay activation of motor 11 each time the motor is to start; the delay is caused by capacitor 211 and resistor 221. Capacitor 214 and resistors 213 and 215 associated therewith delay decoupling of the output of error detector 26 from the input of regulator 16 relative to the decoupling ordered by the signal produced by generator 15.

The operation of the authorizing block 27 will be clearer from a description of the overall operation of system 10, as given infra with reference to FIG. 5.

Figure 2D:
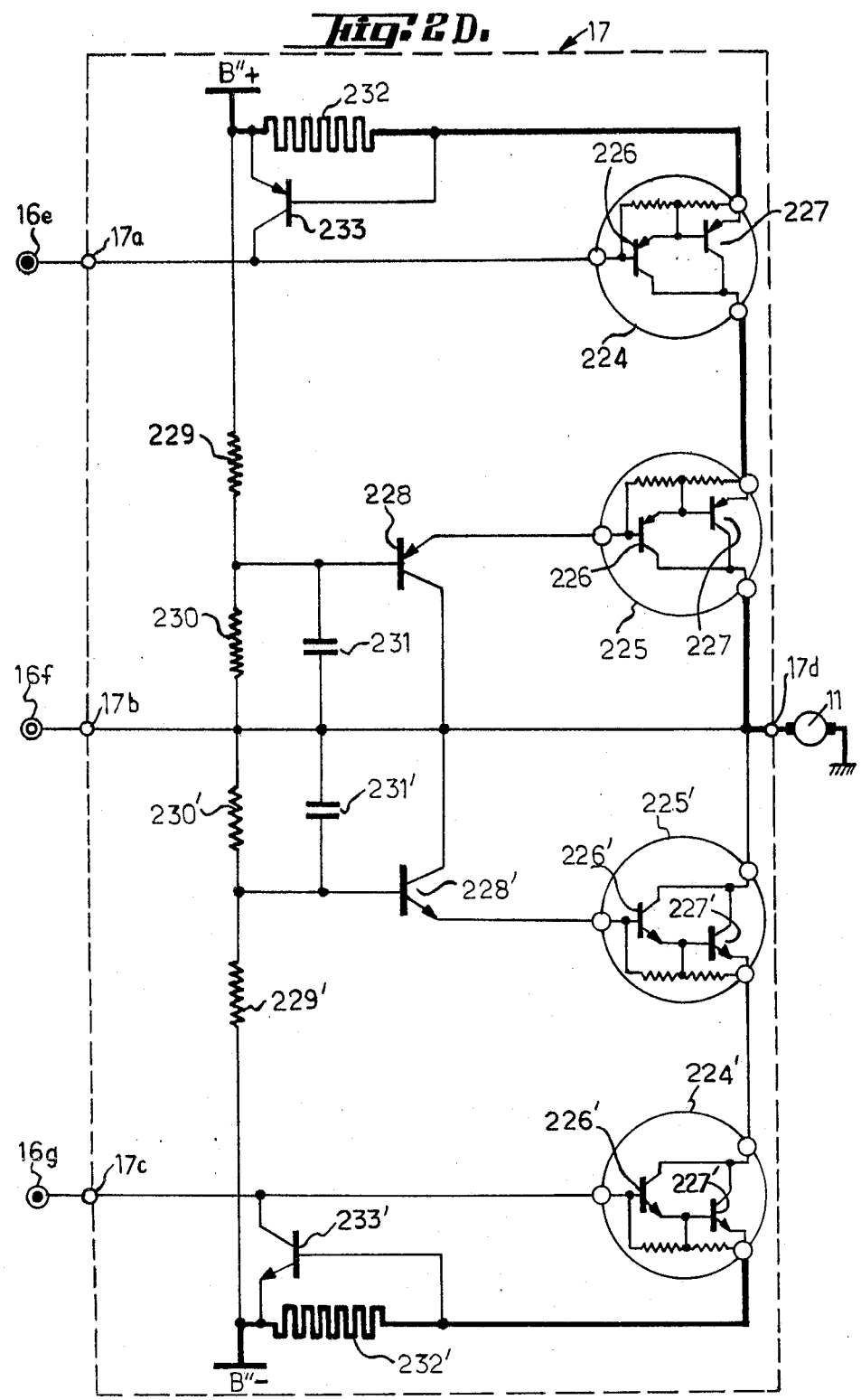

Before the description of the overall operation, consideration will be given to power amplifier 17, FIG. 2D. Amplifier 17 has three input terminals 17a, 17b and 17c and an output terminal 17d connected to one terminal of the armature of motor 11, the other terminal of which is grounded. Terminals 17a, 17b and 17c are respectively connected to output terminals 16e, 16f and 16g of analog regulator 16. Power amplifier 17 is fed by two equal, but opposite polarity sources of DC operating voltage $B''+$ and $B''-$; the value of the voltage is relatively high to drive the motor, and is for example, between 50 and 100 volts.

Amplifier 17 is symmetrical to derive a positive or negative signal depending upon whether the motor is to be driven forward or in reverse. The forward driver is formed by stacked PNP Darlington amplifying circuits 224 and 225 each including transistors 226 and 227 and having main current paths connected in series between output terminal 17d and source B″+. The control terminal of Darlington circuit 224 is connected directly to terminal 17a, while the control terminal of circuit 225 is connected to the emitter of PNP transistor 228, having a collector connected to terminal 17d. The base of transistor 228 is biased by a tap of a voltage divider formed by resistors 229 and 230, connected in series between the source B″+ and terminal 17d; filter capacitor 231 is connected in parallel with resistor 230. Input terminal 17b is connected directly to output terminal 17d of power amplifier 17. The forward running amplifying stage is also provided with a safety arrangement comprising a very low resistance resistor 232, connected in series with amplying circuits 224 and 225 and in shunt with the emitter base junction of bipolar PNP transistor 233, having a collector connected to input terminal 17a.

The reverse running power stage is similar to that which has just been described except that the transistors are of a complementary type (NPN in the present case) to those used in the forward running amplifying stage. Hence, components performing the same functions are assigned the same reference numerals with the suffix """.

The stacked or series connection of amplifying circuits 224 and 225 enables more profitable use to be made of the characteristics of the amplifying circuits when the operating voltage B″ is high, than when the two circuits are connected in parallel as is generally the case in the prior art. Prior art power transistors or amplifying circuits capable of operating at high voltages are extremely expensive. For a given power, there is a great price difference between amplifying circuits or devices which operate at high voltage and low current and those which operate at half the voltage and give twice the current. In addition, there are differences between the characteristics of these two kinds of circuits or devices. For example, if the characteristics of an amplifying device which is able to operate at high voltage are considered, such as the device manufactured by the RTC company under the type number BDX 67B, the manufacturers state that the device is able to tolerate a current of 5 amperes at a voltage of 100 volts for 300 microseconds, and a current of 10 amperes at a voltage of 50 volts for 800 microseconds. Consequently, for the same power (500 watts), there is a threefold increase in the tolerance period. Another drawback of the parallel arrangement is the relatively low input impedance of the amplifying stages. Because each stage must be supplied with a given energizing power the input or preamplifier stage therefore must supply a power level proportional to the number of amplifying stages. The particular power amplifier 17 solves these problems because amplifying circuits 224 and 225 share the high operating voltage B″. In the example selected, where B″ is 50 volts, the amplifying circuit 225 is biased by transistor 228 and resistors 229 and 230 so that the voltage across circuit 224 and 225 in the main current path is 25 volts. The other amplifying circuit 224 is controlled directly from input terminal 17a.

The value of resistor 232 is selected so that, if the required motor current is above a given level, the voltage across the resistor exceeds the base-emitter junction voltage of bipolar transistor 233 and causes the transistor to conduct and shunt at least part of the control signal applied to input terminal 17a. Thereby the control signal supplied to amplifying circuit 224 ensures that the current flowing in motor 11 remains within the planned limits.

A brief summary will now be given of the operation of arrangement 10 by referring to FIG. 5. In FIG. 5, signals A and B are respectively applied to input terminals 21a and 21b of logic control unit 21. Signal C is supplied to input terminal 20a of high speed control generator 20. From signals A, B and C, a forward running order is given between times t1 and t2, a reverse running order is derived between t3 to t4, and a forward running order is derived from t4 to t′″4; during the latter interval an order for high speed running is given between t5 to t7. Running in reverse is ordered from t7.

The solid line portions of signals D and E are derived at output terminals 21e and 21f of logic control unit 21 when delay device 35 has not been triggered by thermal simulation block 22. Normally, up to time t6, the configuration of signals D and E is opposite from the two signals A and B which correspond to them. In effect, from time t5, which is only a very short period before time t6, there is a high speed running order which has priority over signals A and B, as was seen above and as will again be seen below. The broken line portions of signals D and E indicate the effect which delay device 35 has on orders from the thermal simulation block 22. It is seen that starting is delayed for a predetermined length of time. The effect of the delay on signals F to K, FIG. 5, is only that the signals produced during the starting period are translated and are therefore not shown with broken line portions.

It has been seen how signals F and G are respectively produced by normal speed control signal generator 15 and by internal drop compensating arrangement 18. Briefly, the ordered run forward start up lasts from t1 to t″1, while the ordered stop lasts from t2 to t′2. Signal K represents the magnitude of the current which flows through motor 11. Since starting up period t″1-t1 is shorter than the stopping period t′2-t2 a positive forward acceleration current of motor 11 is higher during the starting up period than the negative deceleration or current to brake motor 11 from forward running to a halt. The current polarities are opposite for running in reverse, as can be seen from the waveforms for time t3 to time t′4. If reverse running is ordered toend at time t4, as seen from signals A and B, at the same time as forward running is ordered to start, motor 11 is braked in reverse until time t′4 and then accelerated forward until time t′4. In the example of FIG. 5, high speed running is ordered to begin at time t5 (signal C). During the interval t′6 to t″7, the form of signal J, derived at output terminal 20b of generator 20, is as has been explained with reference to FIG. 7. From time t5, when high speed is ordered to begin (signal C), generator 20 produces gradually increasing signal J which is applied by output terminal 20c to input terminal 21c of the logic control unit 21, to inhibit the logic unit when signal J reaches a predetermined value. This takes place within the short interval between times t5 and t6. Logic control unit 21 is inhibited at time t6 to change the state of signal D at terminal 21e. The state change is reflected by generator 15 and internal drop compensating arrangement 18 to brake motor 11 until time t′6.

The action of authorizing circuit 27 will now be considered. Signals H and I are respectively derived at output terminals 27c and 27b of circuit 27. As was stated above, signal H results from rectifying amplified signal F, so it is present during all the periods when motor 11 is running at normal speed (from t1 to t'2, from t3 to t'6, and after t'7). On the other hand, the signal at terminal 27b causes a slight delay in the start up of motor 11 to prevent digital correcting chain 13 from experiencing any ambiguity in recognizing the motor rotation direction. The signal at terminal 27b also causes a delay after the time when the motor is theoretically stopped to wait for the tape driven by the motor to be completed settled. The starting up delays occur from t1 to t'1, from t3 to t'3, and from t'7 to t'''7. The delays in stopping occur from t'2 to t''2 and from t'6 to t''6.

High speed operation takes place from t'6 to t7; at time t7 fast running is ordered to stop and reverse running at normal speed is ordered to start. From time t7, braking from the high speed takes place until t'7, at which time the motor can start to run in reverse at normal speed, which it does by t''''7.

From waveform K, the constant speed current of motor 11 is very low.

The above description has brought out numerous modifications which may be made to a servocontrol system according to the invention. In particular, it is clearly seen what constitutes the simplest embodiment of a servocontrol system according to the invention. The embodiment described and illustrated is an improved embodiment which provides servocontrol system 10 with considerable advantages as regards accuracy and stability in operation.

It is noted that the delay caused by the authorizing circuit 27 after the stopping period of the motor allows the tape driven by the motor to be repositioned relative to its theoretical stopped position, if required, should the capstan be subjected to forces exerted by the tape after the theoretical desired stop. Also, any initial ambiguity affecting the direction of motor rotation is resolved by authorizing circuit 27.

The above description indicates the advantages which accrue from doubling the frequency of direction detector 24 and from the fact that the digital components which follow the detector respond to each signal edge. This provides an improvement in the response time of the digital correcting chain 13 and thus in positioning accuracy. If simultaneous running orders occur, fast running has priority.

Also, nominal speed can be influenced only by the drift of passive components, namely capacitors and resistors. So speed is absolutely independent of friction.

Because direction detector is formed only by NAND gates, it is independent of motor speed.

Finally, a servocontrol system according to the invention provides all the advantages which were set forth in detail at the beginning of this specification.

While there have been described and illustrated several specific embodiments of the invention, it will be clear that variations in the details of the embodiments specifically illustrated and described may be made without departing from the true spirit and scope of the invention as defined in the appended claims.

I claim:

1. A servocontrol system for a separately excited DC motor comprising an analog servocontrol chain including; a feed forward generator for deriving a control signal for the speed required from the motor, an analog regulator responsive to the speed control signal for deriving a control signal for the motor, and a power amplifier responsive to the motor control signal for adjusting the speed of the motor; a chain for continuously digitally correcting errors between the motor actual position and the desired position including: encoding means coupled to the motor for deriving a first pulsed signal representing the actual motor position, and means for comparing the actual position signal with a desired position signal derived from the required speed signal to derive an error signal to be supplied to the analog regulator, the comparison means including an integrating means having an input terminal connected to one of the output terminals of the increment generator, and to an output terminal of the control signal generator in the analog servocontrol chain.

2. The system of claim 1 wherein the integrating means comprises a differential amplifier having a feedback loop containing a third capacitor connected to accumulate a voltage directly proportionate to the total difference in actual and required speed.

3. The system of claim 2 wherein the third capacitor is connected in parallel with two Zener diodes connected in series with each other and in opposite directions to limit the positive and negative excursions of the output signal from comparison means.

4. The system of claim 2 wherein the third capacitor is connected in parallel with a variable conducting device, delay means responsive to the required speed control signal derived in the analog servocontrol chain for controlling the variable conducting device.

5. The system of claim 4 wherein delay means includes means for providing a first delay in the motor speed control signal, with respect to a time representing the end of a run by the motor.

6. The system of claim 4 or 5 wherein the delay means includes means for providing a second delay in the motor speed control signal with respect to a time representing the beginning of a run by the motor.

7. The system of claim 3 wherein the third capacitor is connected in parallel with a variable conducting device, delay means responsive to the required speed control signal derived in the analog servocontrol chain for controlling the variable conducting device.

8. Apparatus for controlling a separately excited DC motor in response to a command source for running and stopping of a shaft of the motor comprising an open loop controller responsive to the command source for deriving an analog first signal having a magnitude proportional to expected speed of the shaft, whereby said analog signal respectively has increasing, constant and decreasing values in response to changes of the command source during intervals when the shaft is expected to accelerate, run at constant speed and decelerate; an encoder for deriving a signal indicative of the shaft position, means responsive to the encoder for deriving a second signal having a frequency proportional to the displacement of the shaft and thereby indicative of the actual movement of the shaft, means responsive to the first and second signals for deriving an analog error signal for positional errors of the shaft, said error signal having a magnitude and polarity proportional to the integral of the speed indicated by the amplitude of the first signal subtracted from detected movement of the shaft as indicated by the second signal, and means for applying the error signal to a regulator for the motor so the speed of the shaft is controlled by the amplitude of the third signal.

9. The apparatus of claim 8 wherein the command source can command bi-directional running of the shaft, said means for deriving the first signal includes means for reversing the polarity of the first signal in response to the directional command of the shaft, said means for deriving the second signal including means for reversing the phase of the second signal in response to the running direction of the shaft.

10. The apparatus of claim 8 or 9 wherein the means for deriving the error signal includes an integrating capacitor, means for connecting said integrating capacitor to be responsive to the first and second signals so that a first predetermined charge is supplied to the capacitor in response to predetermined incremental movement of the shaft and the capacitor is charged in proportion to the amplitude of the first signal.

11. Apparatus for controlling a separately excited DC motor in response to a command source for running and stopping of a shaft of the motor comprising an open loop controller responsive to the command source for deriving an analog first signal having a magnitude proportional to expected speed of the shaft, whereby said analog signal respectively has increasing, constant and decreasing values in response to changes of the command source during intervals when the shaft is expected to accelerate, run at constant speed and decelerate; an integrating capacitor, first means responsive to the position of the shaft for supplying a predetermined charge to the capacitor for each predetermined change in position of the shaft, second means responsive to the first signal for supplying the capacitor with a charge proportional to the amplitude of the first signal, the charges supplied to the capacitor by the first and second means being such that the charge of the capacitor is a function of an error for desired position of the shaft, and means responsive to the charge on the capacitor for deriving a control signal for the speed of the motor.

12. The apparatus of claim 11 wherein the command source can command bi-directional running of the shaft, said means for deriving the first signal includes means for reversing the polarity of the first signal in response to the directional command of the shaft, said means for supplying the predetermined charge including means for reversing the direction of the charge with changes in the running direction of the shaft.

13. A servocontrol system for a separately excited DC motor comprising an analog servocontrol chain including: a feed forward generator for deriving a control signal for the speed required from the motor, an analog regulator responsive to the speed control signal for deriving a control signal for the motor, and a power amplifier responsive to the motor control signal for adjusting the speed of the motor; a chain for continuously digitally correcting errors between the motor actual position and the desired position including: encoding means coupled to the motor for deriving a first pulsed signal representing the actual motor position, and means for comparing the actual position signal with a desired position signal derived from the required speed signal to derive an error signal to be supplied to the analog regulator, the encoding means comprising an encoder coupled to the motor for deriving a plurality of encoder steps and a second pulsed signal having the same frequency as the steps, said comparing means including an increment generator responsive to at least one of the two edges of the pulses of the second pulsed signal for deriving constant level pulses which form the first pulsed signal, the increment generator including at least one capacitor having a first terminal connected to a source of DC reference voltage and a second terminal connected to an output of the increment generator, and means for varying the charge on the capacitor in response to at least one edge of each of the forward running and/or reverse running signals.

14. The system of claim 13 wherein the analog servocontrol chain includes means for controlling the motor in both rotation directions, the encoder including means for deriving the said second pulsed signal and a third pulsed signal which is an out of phase replica of the second signal, the relative phases of the second and third signals being related to the direction of rotation, the encoding means including a direction detector responsive to the said second and third pulsed signals for supplying the increment generator with a pulsed signal for forward running or a pulsed signal for reverse running depending upon the direction of motor rotation, the increment generator including means responsive to the forward and reverse running signals for deriving the first pulsed signal with a polarity corresponding to the motor rotation direction.

15. The system of claim 14 wherein the said direction detector includes means for multiplying the frequency of the second and third signals produced by the encoding means to derive the pulse signal supplied to the increment generator.

16. The system of claim 14 or 15 wherein the direction detector includes digital gates responsive to said second and third signals for controlling application of one of said second or third signals to said comparing means, said gates enabling the direction detector to be independent of the frequency of the second and third signals.

17. The system of claim 13 wherein the increment generator includes two input terminals respectively responsive to the forward and reverse running signals and connected to first and second capacitors, said first and second capacitors being connected in first and second parallel paths between the respective input terminals and the output terminal of the increment generator, the second path containing an inverter connected in series between a first terminal of the second capacitor and an input terminal of the increment generator.

18. The system of claim 17 wherein the capacitors are respectively connected with first and second output terminals of the increment generator via first and second devices which respectively conduct current undirectionally in opposing directions.

19. The system of claim 14, 17 or 18 wherein the DC voltage source includes a controlled conduction device biassed to compensate for differences between the first and second capacitors.

20. The system of claim 14, or 15, or 13, or 17, or 18 wherein the comparison means includes an integrating means having an input terminal connected to one of the output terminals of the increment generator, and to an output terminal of the control signal generator in the analog servocontrol chain.

21. The system of claim 1, 13, 14, 15, 17, 19, 2, 3 or 5 wherein the analog regulator in the analog servocontrol chain includes a differential amplifier having a first input terminal responsive to the said control signal for the motor speed and a second input terminal responsive to the error signal produced by the comparison means.

22. The system of claim 1, 13, 14, 15, 17, 18, 2, 3 or 5 wherein the analog servocontrol chain includes compensating means responsive to the speed control signal for simulating an internal motor drop as a function of the motor current which the motor carries and for deriving a compensating signal, and means for linearly combining the compensating signal and the required speed signal.

23. The system of claim 1, 13, 14, 15, 17, 18, 2, 3, or 5 wherein the analog regulator in the analog servocontrol chain includes a differential amplifier having a first input terminal responsive to the said control signal for the motor speed and a second input terminal responsive to the error signal produced by the comparison means, the analog servocontrol chain including a generator for generating a high speed control signal, said high speed control generator having one output connected to the said first input terminal of the differential amplifier in the analog regulator.

24. The system of claim 1, 13, 14, 15, 17, 18, 2, 3, or 5 wherein the analog regulator in the analog servocontrol chain includes a differential amplifier having a first input terminal responsive to the said control signal for the motor speed and a second input terminal responsive to the error signal produced by the comparison means, the analog servocontrol chain including a generator for generating a high speed control signal, said high speed control generator having one output connected to the said first input terminal of the differential amplifier in the analog regulator, further including a logic control unit responsive to an output of the high speed control signal generator for inhibiting the control signal generator for the required speed in response to derivation of the high speed control signal.

25. The system of claim 1, 13, 14, 15, 17, 18, 2, 3 or 5 further including a thermal simulator for the motor, a logic control unit responsive to the control signal generator including means for delaying the motor speed signal in response to the simulator indicating overheating of the motor.

* * * * *